(12) United States Patent
Fransen et al.

(10) Patent No.: US 9,705,250 B2
(45) Date of Patent: Jul. 11, 2017

(54) PATCH CORD PLUG ORGANIZER

(71) Applicant: Panduit Corp., Tinley Park, IL (US)

(72) Inventors: Robert E. Fransen, Tinley Park, IL (US); Thomas M. Baum, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 4 days.

(21) Appl. No.: 15/070,118

(22) Filed: Mar. 15, 2016

(65) Prior Publication Data

US 2016/0248197 A1 Aug. 25, 2016

Related U.S. Application Data

(63) Continuation of application No. 14/454,921, filed on Aug. 8, 2014, now Pat. No. 9,293,862.

(60) Provisional application No. 61/870,000, filed on Aug. 26, 2013.

(51) Int. Cl.
*H01R 13/62* (2006.01)
*H01R 13/629* (2006.01)
*H01R 13/633* (2006.01)
*H01R 13/518* (2006.01)
*H01R 24/64* (2011.01)
*H04Q 1/02* (2006.01)
*H04Q 1/06* (2006.01)
*H01R 13/627* (2006.01)
*H01R 107/00* (2006.01)

(52) U.S. Cl.
CPC ......... *H01R 13/629* (2013.01); *H01R 13/518* (2013.01); *H01R 13/633* (2013.01); *H01R 24/64* (2013.01); *H04Q 1/02* (2013.01); *H04Q 1/06* (2013.01); *H04Q 1/13* (2013.01); *H01R 13/6271* (2013.01); *H01R 2107/00* (2013.01); *H01R 2201/04* (2013.01)

(58) Field of Classification Search
CPC .................................................... H01R 13/518
See application file for complete search history.

(56) References Cited

U.S. PATENT DOCUMENTS

| | | | |
|---|---|---|---|
| 3,954,238 A | 5/1976 | Nivet | |
| 3,997,234 A * | 12/1976 | Worman | ............ H01R 13/6335 |
| | | | 439/456 |
| 4,623,102 A | 11/1986 | Hough, Jr. | |
| 5,125,854 A * | 6/1992 | Bassler | ................ H01R 13/514 |
| | | | 439/536 |
| 5,184,794 A | 2/1993 | Saito | |
| 5,535,969 A | 7/1996 | Duffy, Jr. | |
| 5,566,269 A | 10/1996 | Eberle, Jr. et al. | |
| 5,613,655 A | 3/1997 | Marion | |

(Continued)

FOREIGN PATENT DOCUMENTS

| | | |
|---|---|---|
| JP | 10-274359 A | 10/1998 |
| JP | 11-122758 A | 4/1999 |

*Primary Examiner* — Ross Gushi
(74) *Attorney, Agent, or Firm* — Christopher S. Clancy; James H. Williams; Aimee E. McVady (57) ABSTRACT

The present invention is directed to a cable organizer. The cable organizer has a base with a plurality of ports. Each port is configured to hold a plug extending from a patch cord. The cable organizer also has a plurality of flanges connected to the base and a plurality of latch mechanisms. Each flange defines a side of one of the ports and each latch mechanism is connected to the ports by a pivot element.

12 Claims, 8 Drawing Sheets

(56) References Cited

U.S. PATENT DOCUMENTS

| | | | | |
|---|---|---|---|---|
| 5,675,682 A | * | 10/1997 | De Marchi | H01R 13/6275 385/139 |
| 5,820,048 A | | 10/1998 | Shereyk et al. | |
| 6,109,978 A | * | 8/2000 | Stellman | H01R 13/514 439/484 |
| 6,123,564 A | * | 9/2000 | Belmore, III | H01R 13/518 324/538 |
| 6,332,798 B1 | * | 12/2001 | Farooq | H01R 13/633 439/344 |
| 6,343,950 B1 | * | 2/2002 | Eginton | G02B 6/3879 439/157 |
| 6,539,161 B2 | | 3/2003 | Holman et al. | |
| 6,547,585 B2 | * | 4/2003 | Bradley | H01R 13/633 439/353 |
| 6,595,798 B1 | * | 7/2003 | Pook | H01R 13/62933 29/267 |
| 6,665,484 B2 | | 12/2003 | Douglas et al. | |
| 6,672,898 B2 | * | 1/2004 | Kahle | G02B 6/3879 385/55 |
| 6,768,858 B2 | | 7/2004 | Tinucci et al. | |
| 6,771,871 B2 | | 8/2004 | Krampotich et al. | |
| 6,796,844 B1 | * | 9/2004 | Edwards, III | H01R 13/518 439/638 |
| 6,857,900 B2 | * | 2/2005 | Kleeberger | H01R 13/6215 385/76 |
| 6,892,020 B2 | | 5/2005 | Douglas et al. | |
| 6,947,654 B2 | | 9/2005 | Krampotich et al. | |
| 7,097,473 B2 | | 8/2006 | Krampotich et al. | |
| 7,140,911 B1 | * | 11/2006 | Rector | H01R 13/518 439/49 |
| 7,345,241 B2 | | 3/2008 | Caveney et al. | |
| 7,374,447 B2 | * | 5/2008 | Matsumoto | H01R 13/518 439/344 |
| 7,381,087 B2 | * | 6/2008 | Alvarez | H01R 13/518 439/540.1 |
| 7,396,252 B2 | | 7/2008 | Rocker et al. | |
| 7,619,164 B2 | | 11/2009 | Caveney et al. | |
| 7,901,237 B2 | * | 3/2011 | Abe | H01R 43/26 439/354 |
| 7,976,346 B2 | * | 7/2011 | Guy | H01R 13/2421 439/638 |
| 8,167,638 B2 | * | 5/2012 | Wojcik | H01R 13/506 439/352 |
| 8,290,330 B2 | | 10/2012 | Taylor et al. | |
| 8,323,046 B1 | * | 12/2012 | Daugherty | H01R 13/639 439/352 |
| 8,425,247 B2 | * | 4/2013 | Wojcik | H01R 13/506 439/352 |
| 8,602,807 B2 | * | 12/2013 | Wojcik | H01R 13/506 439/352 |
| 8,764,308 B2 | * | 7/2014 | Irwin | G02B 6/3879 385/134 |
| 8,794,998 B2 | * | 8/2014 | Hashimoto | H01R 13/62 439/344 |
| 9,069,149 B2 | * | 6/2015 | Yu | G02B 6/3898 |
| 9,203,202 B2 | | 12/2015 | Wojcik et al. | |
| 2007/0020994 A1 | * | 1/2007 | Alvarez | H01R 13/518 439/540.1 |
| 2010/0267251 A1 | * | 10/2010 | Phu | H01R 31/06 439/49 |
| 2011/0147542 A1 | | 6/2011 | Hock | |
| 2011/0312203 A1 | * | 12/2011 | Liu | H01R 43/26 439/345 |
| 2012/0190230 A1 | * | 7/2012 | Wojcik | H01R 13/506 439/352 |
| 2014/0094055 A1 | * | 4/2014 | Wojcik | H01R 13/506 439/533 |
| 2015/0056832 A1 | * | 2/2015 | Fransen | H01R 13/518 439/153 |

* cited by examiner

PATCH CORD PLUG ORGANIZER

CROSS-REFERENCE TO RELATED APPLICATIONS

This application is a continuation of U.S. patent application Ser. No. 14/454,921, filed Aug. 8, 2014, which issued as U.S. Pat. No. 9,293,862 on Mar. 22, 2016, which claims priority to U.S. Provisional Application No. 61/870,000, filed Aug. 26, 2013, the subject matter of which is hereby incorporated by reference in its entirety.

BACKGROUND OF THE INVENTION

The present invention relates to a patch cord plug organizer, and more particularly to a patch cord plug organizer with mass plug insertion and mass plug removal capability.

Quick deployment of telecom rooms and data centers is advantageous in order to lower costs to deploy such facilities and to reduce the time it takes to bring such facilities on line. One potentially time consuming effort is patching between patch panels and switches, for example. Patch panels and switches typically have individual RJ45 ports (or other form factor such as SFP+, fiber optic, etc.), a respective patch cord connects a port on a switch to a patch panel port, and this process can be repeated with hundreds of patch cords for even a relatively small telecom room, with data centers having much greater patching requirements. If multiple patch cables are organized into a cable assembly which assembly ends that can be inserted and removed en masse (i.e., mass plug insertion and mass plug removal) then significant time savings can be achieved during installation.

One challenge to such a design is that switch port jacks are typically configured differently than patch panel jacks. Switch port jacks can be in two rows with the upper and lower jacks in opposed configuration as the two rows are mounted on opposite sides of the same circuit board within the switch. In contrast, a high density patch panel can have two rows of jacks in one rack unit (1 RU) but the upper and lower jacks are typically in the same configuration with the plug interface contacts faced downward to reduce the opportunity of dust, and other contaminants, settling on the contacts. Further, jacks within the switches are spaced differently than patch panel jacks because of the different manufacture and function of the respective pieces of equipment.

Another consideration in patch cable assembly design is troubleshooting individual patch cords. In the event of a channel problem it may be necessary to remove and reinstall an individual patch cord and accomplish such removal and installation without disturbing other patch cords.

U.S. Pat. No. 8,167,638 (Wojcik et al.), incorporated by reference as if fully set forth herein, describes an advantageous multi-position quick release plug cassette assembly which accomplishes mass plug insertion, mass plug removal; and individual patch cord removal and installation if needed. However, this plug cassette assembly is particularly suited for the switch end as the plug rows are oriented in an opposed configuration.

A cable connector holder is known for connecting and disconnecting multiple cable connectors; however, this holder only positively engages the outer plug latches as the inner plug latches are continuously depressed. There are several disadvantages to such a design. One disadvantage of this holder is that a plug latch, when properly engaged in a jack, ensures proper contact between respective plug/jack contacts. By continuously depressing the inner latches, the inner plugs may not have proper engagement with respective jack contacts. Additionally, latches are typically made of plastic and plastic can exhibit creep when under a continuous load, therefore with time the inner latches may be rendered non-functioning. Further, this holder does not allow for individual patch cord removal and installation without disassembly of the holder.

It is desirable to provide a cable management device that organizes the plug ends of patch cords to allow for mass insertion of multiple plugs into a patch panel or switch, or other similar equipment. It is also desirable to provide a cable management device that enables individual plug removal without affecting the remaining attached plugs as well as simultaneous removal of multiple plugs from the associated equipment.

SUMMARY OF THE INVENTION

A cable organizer designed to hold a plurality of plugs is disclosed. The cable organizer has a base with a plurality of ports. The sides of the ports are defined by a plurality of flanges extending from the base. The cable organizer also includes a plurality of latch mechanisms. The latch mechanisms are connected to the ports by a pivot element. The latch mechanism enables the plugs to be secured and released, as desired, with respect to the cable organizer.

DETAILED DESCRIPTION

Figure 1:
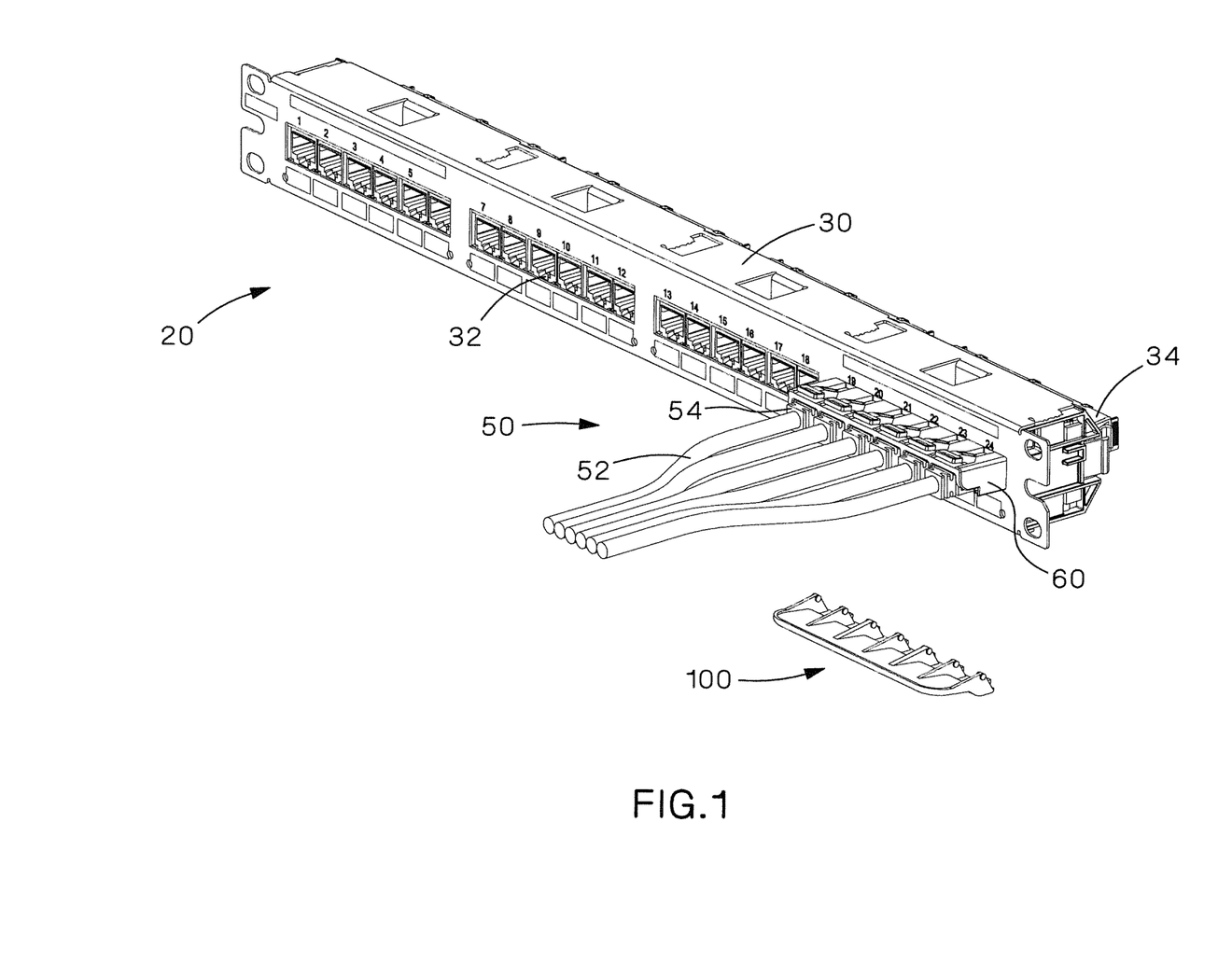
FIG. 1 is a perspective view of a communication system, according to an embodiment of the present invention, including a patch panel and a cable assembly with an embodiment of a patch cord plug organizer of the present invention installed therein and a removal tool of the present invention exploded therefrom.

Referring to FIG. 1, the present invention includes a communication system 20 with a patch panel 30 that is populated with RJ45 jacks 32 in QuickNet™ cassettes 34. Cable assembly 50 can be connected to patch panel 30. Cable assembly 50 includes patch cables 52 terminated with respective RJ45 plugs 54 that are installed in a one piece patch cord plug organizer 60. Plugs 54 are inserted into jacks 32 to allow data to flow in both directions through the connectors. A removal tool 100 is used to remove plugs 54, en masse, from patch panel 30; and organizer 60 allows plugs 54 to be inserted, also en masse, into patch panel 30.

Although communication equipment 30 is illustrated as a patch panel in FIG. 1, equipment 30 can be passive equipment or active equipment, and can be in a multi-port cassette configuration as is the case with QuickNet™ cassettes 34, or other port configurations. Examples of passive equipment that may contain other port configurations can be, but are not limited to, modular patch panels, punch-down patch panels, shielded patch panels, intelligent patch panels, coupler patch panels, wall jacks, etc. Examples of active equipment can be, but are not limited to, Ethernet switches, routers, servers, physical layer management systems, and power-over-Ethernet equipment as can be found in data centers/telecommunications rooms; security devices (cameras and other sensors, etc.) and door access equipment; and telephones, computers, fax machines, printers and other peripherals as can be found in workstation areas. Communication system 20 can further include cabinets, racks, cable management and overhead routing systems, and other such equipment.

Figure 2:
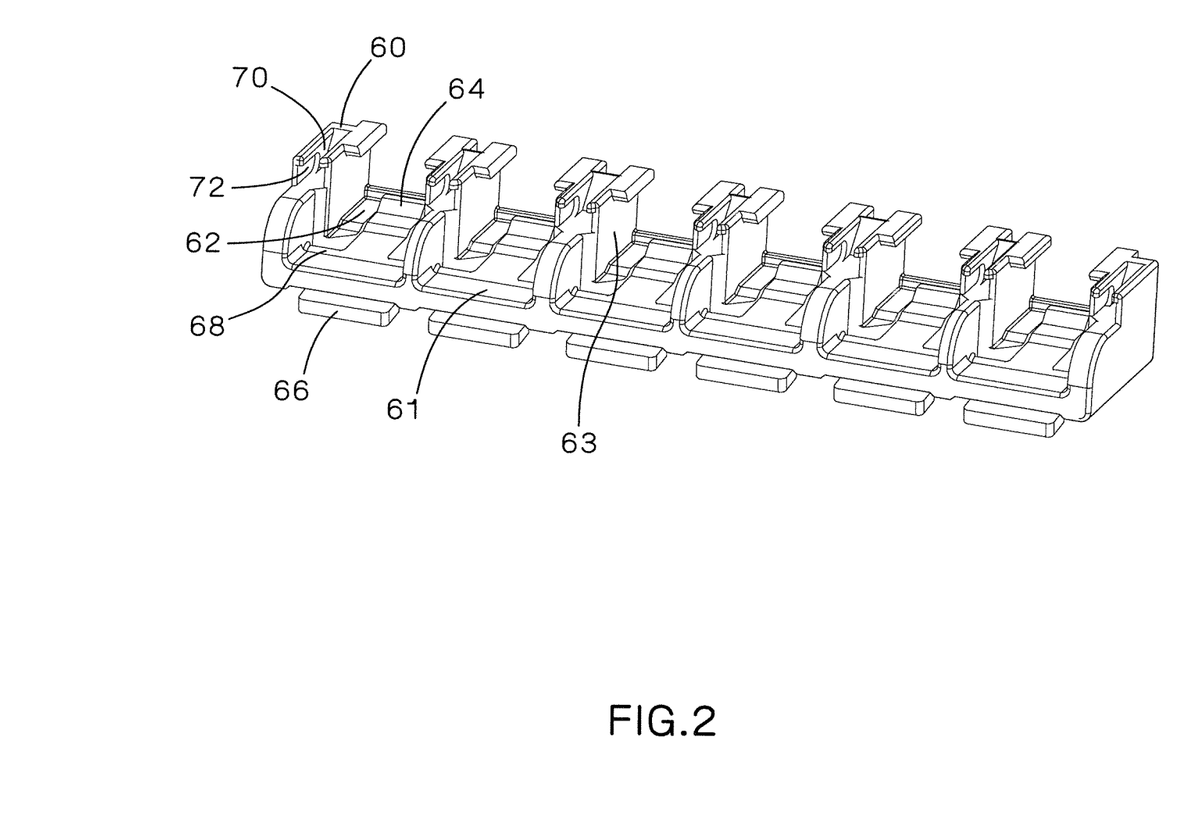
FIG. 2 is a bottom perspective view of the patch cord plug organizer of FIG. 1.
Figure 3:
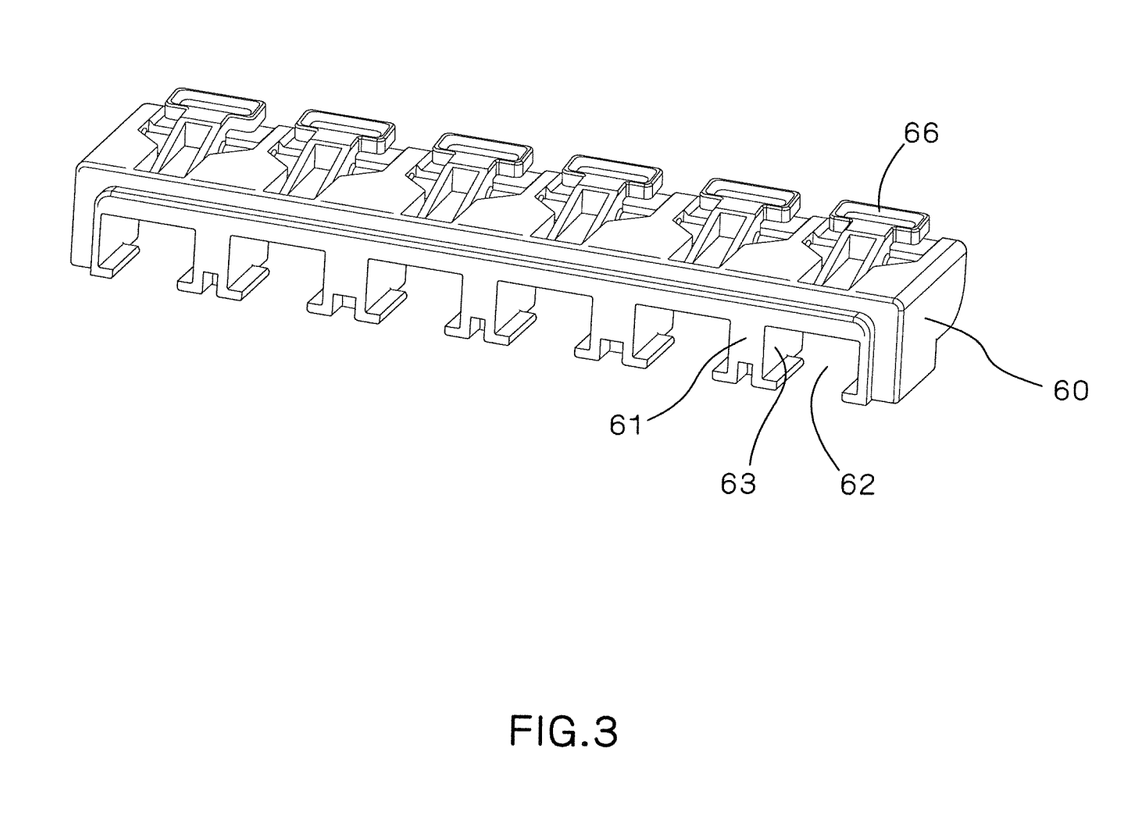
FIG. 3 is a top perspective view of the patch cord plug organizer of FIG. 1.

Referring now to FIGS. 2 and 3, patch cord plug organizer 60 includes base 61 with a plurality of ports 62 for receiving RJ45 plugs 54, including shielded and unshielded CAT5e, CAT6, CAT6A, CAT7, CAT8, and higher data rates, as well as all keyed and 28/30 gauge RJ45 plugs. The sides of each port 62 are defined by flanges 63. Each port 62 in patch cord plug organizer 60 includes a latch feature 64, a lever 66 and an axial bar 68. As described below with respect to FIG. 6, each latch feature 64 is positioned in a recess 56 of each plug 54 to secure plug 54 to patch cord plug organizer 60. Ports 62 in patch cord plug organizer 60 are oriented to enable plugs 54 to be inserted in jacks 32.

Patch cord plug organizer 60 also includes a plurality of slot openings 70 with a slot opening positioned adjacent each side of ports 62. Each slot opening includes axial relief features 72 that accommodate pivot points 110 of removal tool 100. As described below, slot openings 70 and axial relief features 72 receive removal tool 100 to enable mass removal of plugs 54 positioned in patch cord plug organizer 60.

Figure 4:
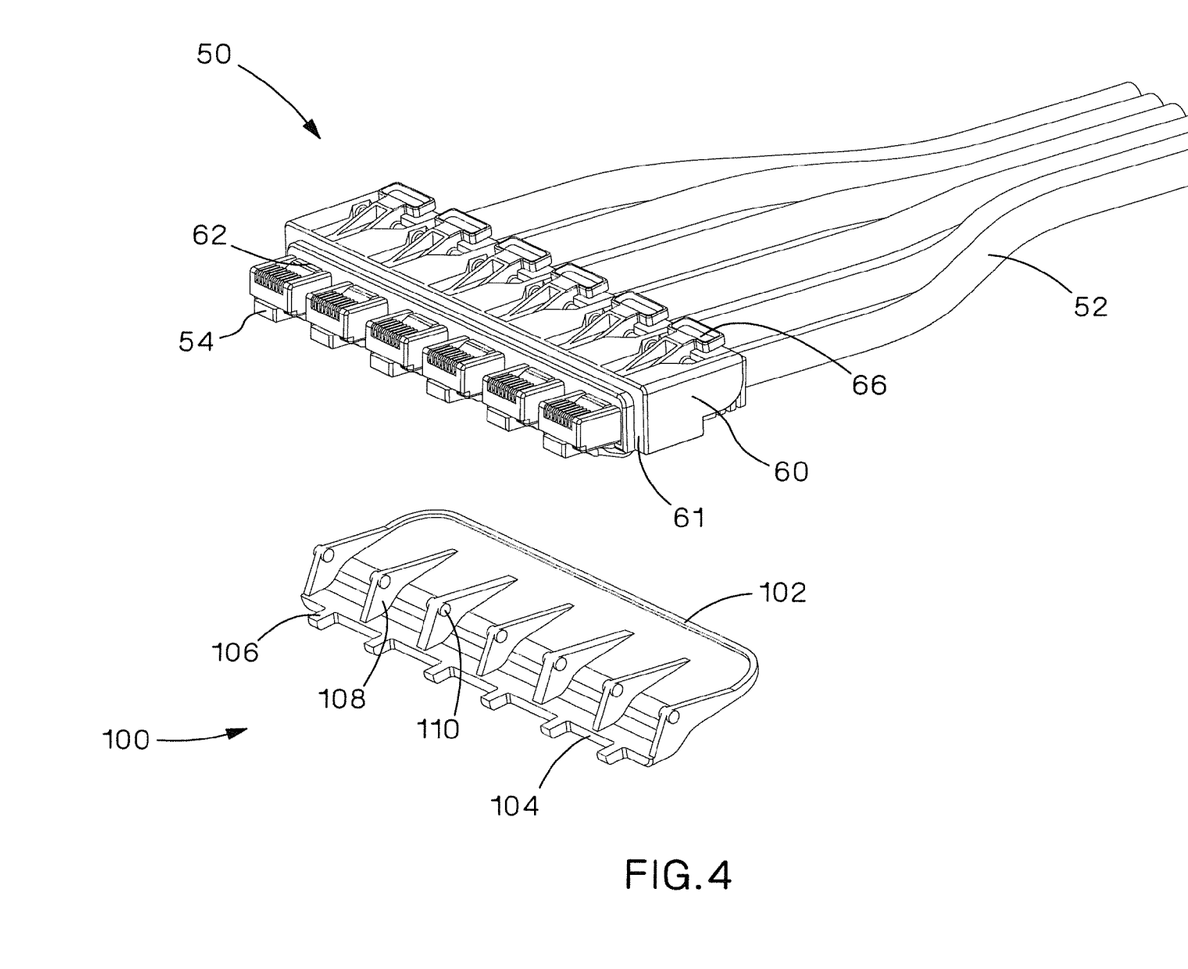
FIG. 4 is a top perspective view of the cable assembly with the patch cord plug organizer and a bottom perspective view of the removal tool of FIG. 1.
Figure 5:
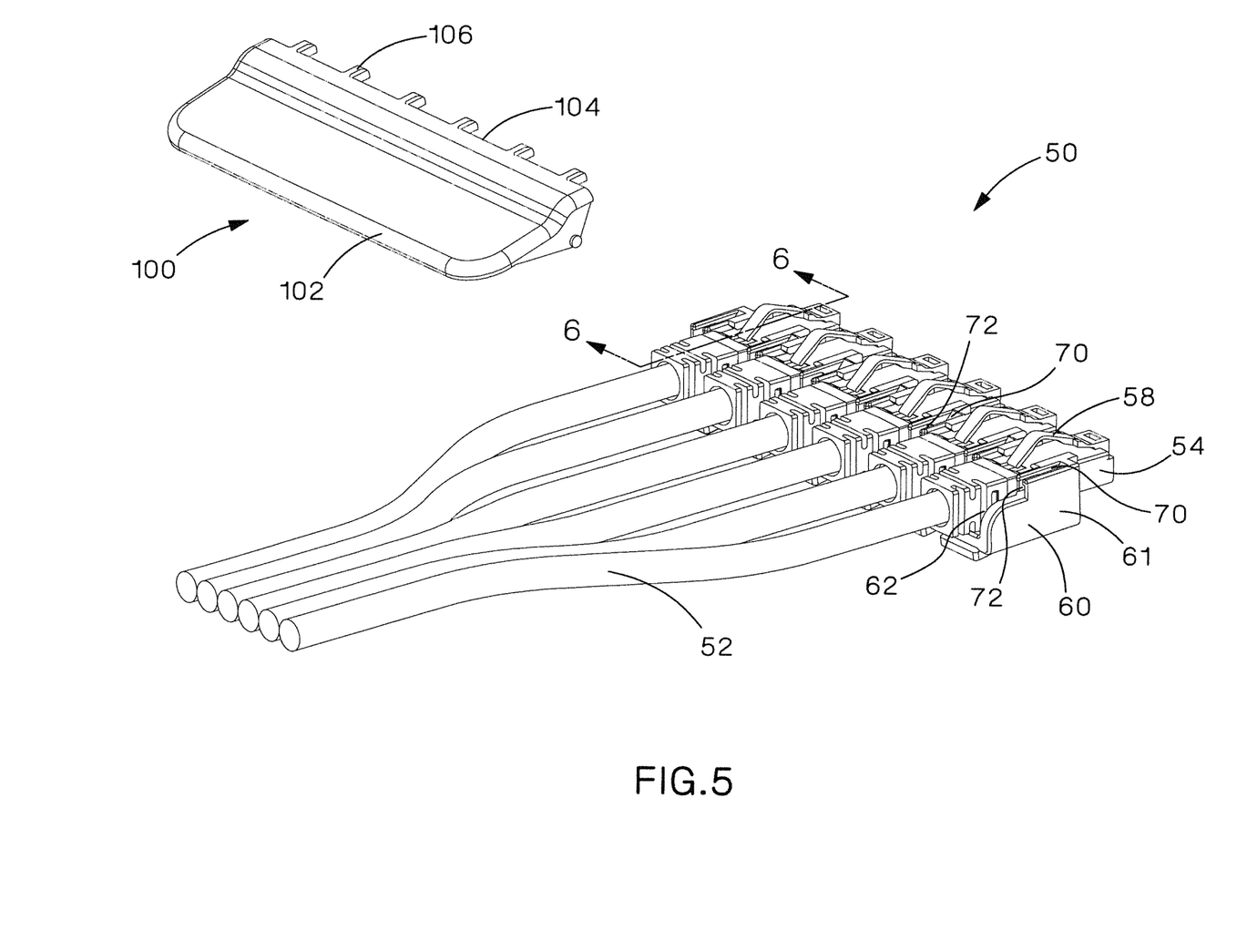
FIG. 5 is a bottom perspective view of the cable assembly with the patch cord plug organizer and a top perspective view of the removal tool of FIG. 1.

FIGS. 4 and 5 illustrate cable assembly 50 of the present invention removed from patch panel 30, and removal tool 100 of the present invention positioned to be installed in patch cord plug organizer 60. Patch cord plug organizer 60 orients and spaces RJ45 plugs 54 when they are mounted in ports 62. Removal tool 100 includes a first end or paddle 102 and a second end 104. Second end 104 includes a plurality of tabs 106. Removal tool 100 is installed over plugs 54 with a tab 106 positioned over each plug latch 58 (see FIG. 8). Removal tool 100 also includes a plurality of flanges 108 with pivot points 110 allowing rotation of removal tool 100 when inserted in organizer as further described below.

Figure 6:
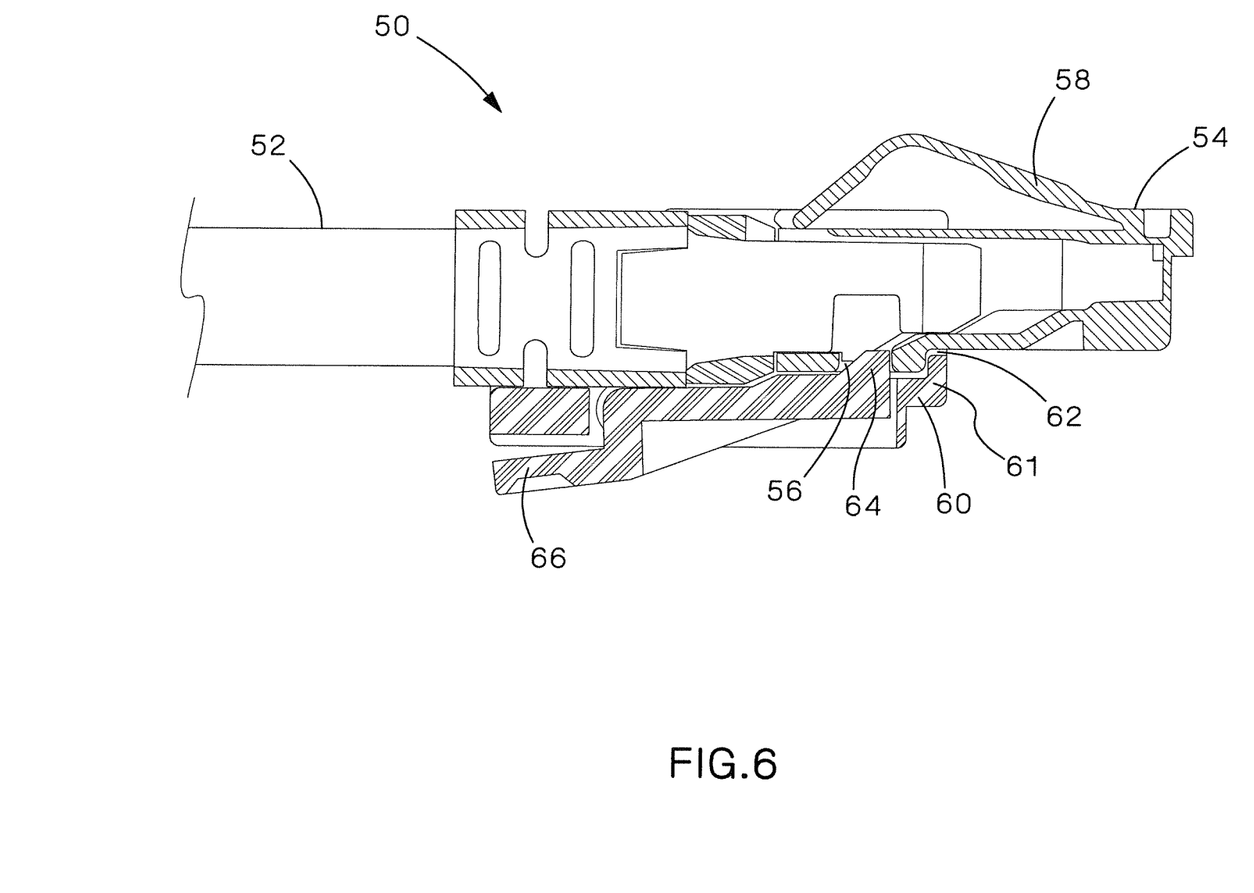
FIG. 6 is a cross sectional view of a plug installed in the patch cord plug organizer taken along section line 6-6 of FIG. 5.

FIG. 6 illustrates a cross-sectional view of a RJ45 plug 54 installed in patch cord plug organizer 60. RJ45 plug 54 is locked in a port 62 in patch cord plug organizer 60 by latch feature 64. Latch feature 64 engages recess 56 found on the underside of RJ45 plug 54. To individually remove RJ45 plug 54 from patch cord plug organizer 60, lever 66 at opposite end of latch feature 64 is depressed to rotate latch feature 64 away from recess 56 and release an individual RJ45 plug 54.

Figure 7:
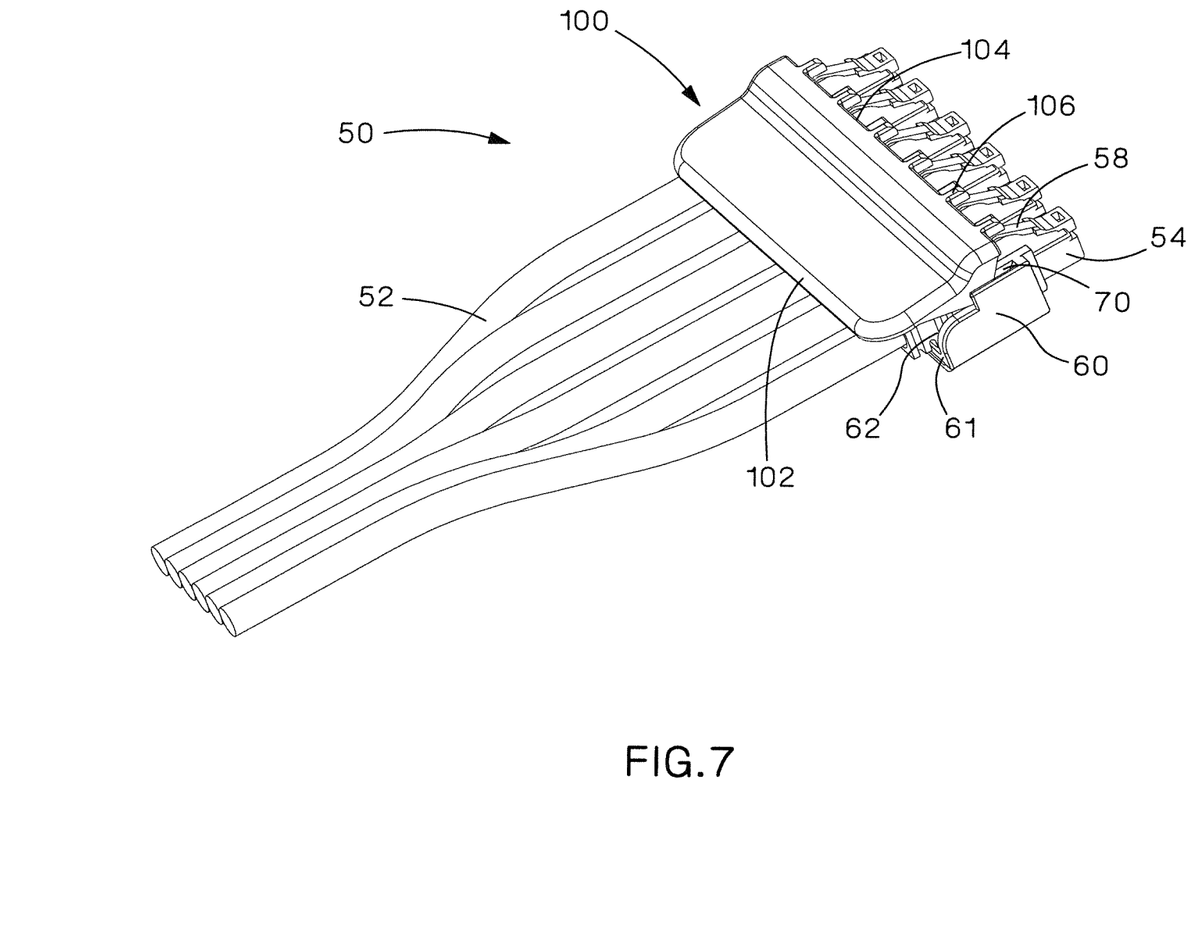
FIG. 7 is a bottom perspective view of the cable assembly of FIG. 5 with the removal tool attached to the patch cord plug organizer.

FIG. 7 illustrates the cable assembly 50 installed in patch cord plug organizer 60 with removal tool 100 attached thereto. Removal tool 100 is designed to provide mass removal, from a patch panel or the like, of the plugs 54 installed in the patch cord plug organizer 60.

Figure 8:
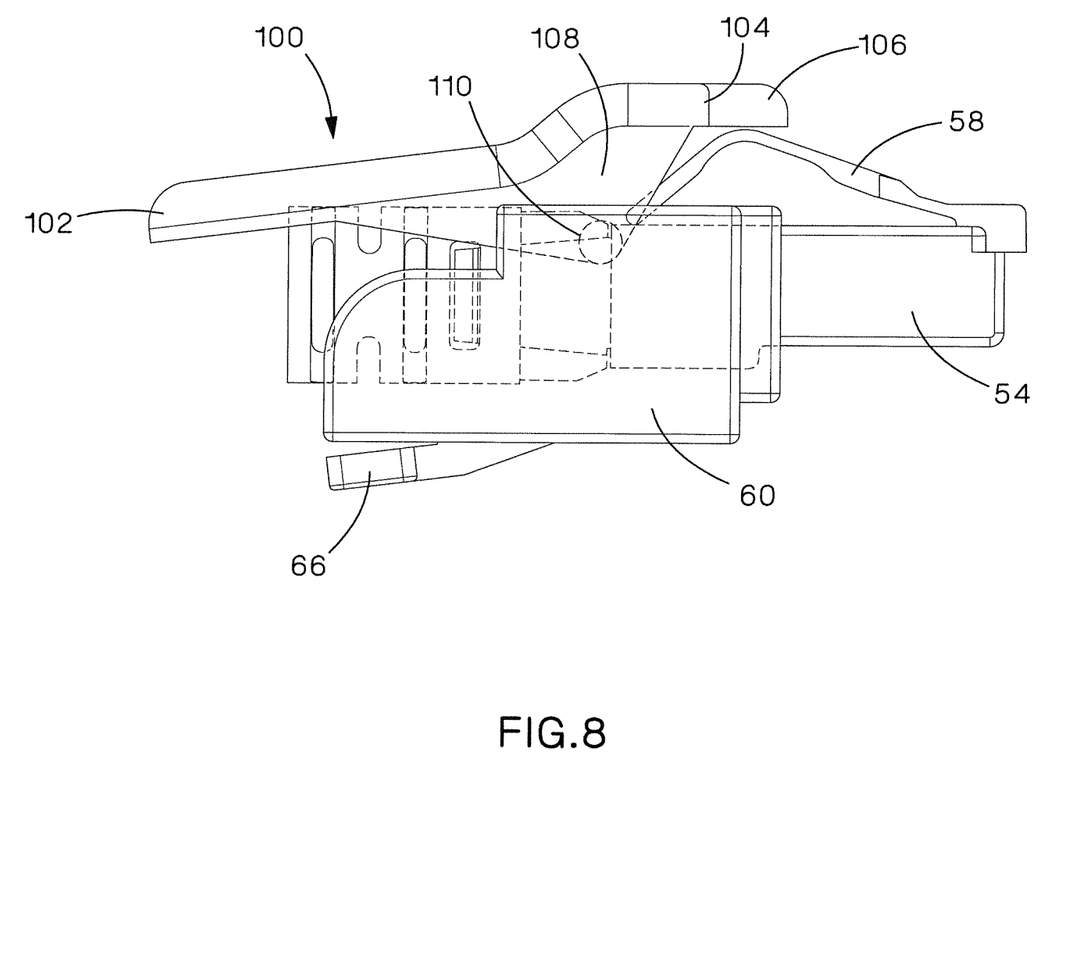
FIG. 8 is a partial see-through side view of the cable assembly with the removal tool attached to the patch cord plug organizer of FIG. 7.

FIG. 8 illustrates a side view of cable assembly 50 with cables 52 removed. Plug 54 and removal tool 100 are visible through patch cord plug organizer 60. When removal tool 100 is inserted into slot openings 70, axial relief features 72 of patch cord plug organizer 60 capture pivot points 110 of removal tool 100. Axial relief features 72 allow removal tool 100 to rotate when attached to patch cord plug organizer 60. The axial rotation of tool 100 is controlled by pivot points 110. As one end 102 of removal tool 100 is engaged, removal tool 100 rotates and tabs 106 at opposite end 104 move in the opposite direction. Tabs 106 then depress plug latches 58 to simultaneously release plugs 54 from RJ45 jacks 32.

Although patch cord plug organizer 60 and removal tool 100 of the present invention are designed with six plug ports 62, the patch cord plug organizer 60 and removal tool 100 can be modified to include more or less ports, as desired.

The one piece patch cord plug organizer of the present invention controls the orientation of the inserted patch cord plugs and allows for mass insertion of the plugs into the jacks in the patch panel or other equipment. The one piece patch cord plug organizer allows for individual actuation of a respective latch release for removal of an individual plug and allows for mass removal of the plugs with the removal tool.

Other advantages of at least one embodiment of the present invention include a low profile cable organizer which allows mass insertion and mass removal of plugs, and removal of individual plugs. Yet other advantages of at least one embodiment of the present invention are that it is a one piece design that is relatively easy to manufacture and use, and is usable in stacked configurations such as high density (and other) patch panels, switches, routers, servers, and other multiport communication equipment.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed:

1. A patch cord plug organizer for a plurality of plugs, the patch cord plug organizer comprising:
    a plurality of ports, each port configured to hold one of the plurality of plugs;
    a plurality of flanges defining sides of the plurality of ports;
    a plurality of latch mechanisms pivotally connected to the plurality of ports, wherein each latch mechanism includes a latch feature connected to a lever, and a pivot element connected between the latch feature and the lever.

2. The patch cord plug organizer of claim 1, wherein the pivot element is an axial bar.

3. The patch cord plug organizer of claim 1, wherein each flange includes a slot with an axial relief feature for engaging a removal tool.

4. A cable management device for organizing a plug end of patch cords to enable mass insertion of multiple plugs into a patch panel, the cable management device comprising:
    a plurality of ports, each port configured for holding a respective plug of one of the patch cords;

a plurality of flanges defining sides of the plurality of ports, wherein each flange includes a slot configured for receiving a removal tool; and a plurality of latch mechanisms connected to the plurality of ports by a pivot element;

wherein the cable management device is a single piece.

5. The cable management device of claim 4, wherein the plurality of latch mechanisms including levers, wherein each lever is capable of individual actuation for removal of an individual plug.

6. The cable management device of claim 4, further comprising a removal tool.

7. The cable management device of claim 6, wherein each slot receives the removal tool, wherein the removal tool rotates to simultaneously depress plug latches for mass removal of all installed plugs.

8. The cable management device of claim 6, wherein the removal tool comprising a first end having a paddle for applying pressure; a second end connected to the paddle, the second end having a plurality of tabs, each tab being positioned to engage a respective latch of the plurality of plugs; and a plurality of flanges between the first end and the second end, each of the flanges including a corresponding pivot point.

9. A cable management device for organizing a plug end of patch cords to enable mass insertion of multiple plugs into a patch panel, the cable management device comprising:

a plurality of ports, each port configured for holding a respective plug of one of the patch cords;

a plurality of flanges defining sides of the plurality of ports, wherein each flange includes a slot configured for receiving a removal tool; and a plurality of latch mechanisms connected to the plurality of ports by a pivot element, wherein the plurality of latch mechanisms include levers, wherein each lever is capable of individual actuation for removal of an individual plug.

10. The cable management device of claim 9, further comprising a removal tool.

11. The cable management device of claim 10, wherein each slot receives the removal tool, wherein the removal tool rotates to simultaneously depress plug latches for mass removal of all installed plugs.

12. The cable management device of claim 10, wherein the removal tool comprising a first end having a paddle for applying pressure; a second end connected to the paddle, the second end having a plurality of tabs, each tab being positioned to engage a respective latch of the plurality of plugs; and a plurality of flanges between the first end and the second end, each of the flanges including a corresponding pivot point.

* * * * *